Oct. 10, 1950         C. H. TAYLOR         2,525,736
ANCHORING DEVICE
Filed Sept. 4, 1946
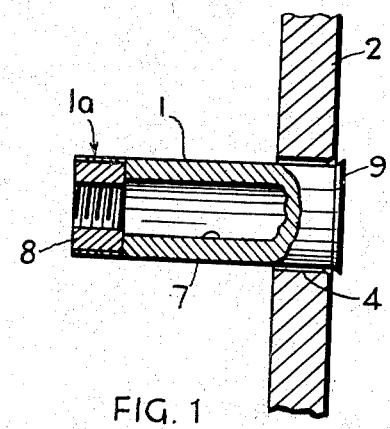
FIG. 1
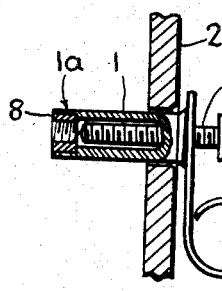   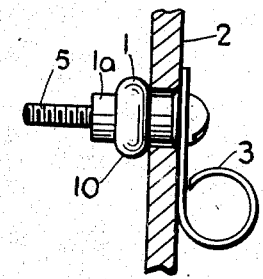   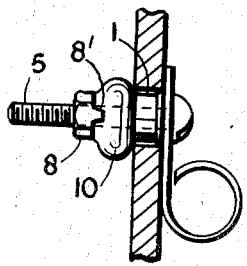
FIG. 2          FIG. 3          FIG. 4
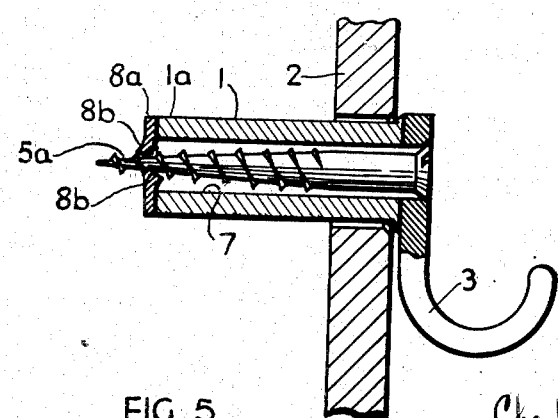
FIG. 5
INVENTOR
Charles Harold Taylor
by
Attorneys  Peck & Peck Patented Oct. 10, 1950

2,525,736

UNITED STATES PATENT OFFICE 2,525,736

ANCHORING DEVICE

Charles Harold Taylor, New Barnet, England, assignor to The Rawlplug Company Limited, London, England Application September 4, 1946, Serial No. 694,700
In Great Britain July 25, 1946

2 Claims. (Cl. 85—2.4)

This invention relates to anchoring devices for use in fixing articles to walls or the like and is particularly concerned with devices which shall be capable of use in those cases where the wall or the like is a relatively thin sheet or strip material structural members, e. g. wall or ceiling board, laths, stiffeners, or the like, and access can only be had to the one face thereof on which the article is to be secured.

The object of the invention is to provide an improved anchoring device for these purposes which shall be simple to use, highly effective in operation, and shall have certain other advantages.

The invention consists of an anchoring device for use in fixing articles to relatively thin walls or the like comprising a deformable sleeve of a length somewhat greater than the thickness of the wall or the like and of a maximum transverse dimension less than that of the fixing hole and deformable by axial compression to an external diameter greater than that of the fixing hole, and a nut element engageable by a threaded fixing member which passes through the sleeve, the arrangement being such that the tightening of the threaded fixing member after the sleeve has been inserted into the hole will cause axial compression of the sleeve with consequent radial expansion thereof until it engages the back edge of the hole when its projecting length expands to a diameter larger than that of the hole over the remainder of its length.

The deformable sleeve is preferably elastic and conveniently of rubber and the nut element may be of a hard material, e. g. metal or vulcanised fibre, either formed initially with an internal screw-thread suited to the thread of the bolt or screw or such that the bolt or screw may cut its own thread therein. With advantage, the element may be secured on or in the sleeve, as by being bonded or vulcanised thereto, but it may also have projections or recesses which are adapted to engage the sleeve under axial pressure and prevent relative rotation of the two parts. In some cases the sleeve is formed with a bead or shoulder at the end remote from the nut element.

The nature of the invention will be clearly understood from the following description of examples of anchoring devices in accordance therewith and illustrated in the accompanying diagrams in which:

Fig. 1 is a part-sectional view of a sleeve in position in a fixing hole through a wall-board prior to the mounting of the article to be fixed;

Fig. 2 is a sectional view similar to Fig. 1 and showing a cable clip in position for securing by the fixing screw;

Fig. 3 shows the anchoring device after the fixing screw has been tightened;

Fig. 4 shows an anchoring device employing an alternative form of nut; and

Fig. 5 shows a further alternative form of nut which is particularly suitable for use with wood screws.

Referring first to Figs. 1–3 a rubber sleeve of cylindrical tubular shape and of medium hardness, is made of a length about three times the thickness of the wall-board 2 to which an article e. g. a cable clip 3 is to be secured and of an external diameter about twice that of the fixing bolt 5 to be employed. The sleeve is inserted into the fixing hole 4 in the wall-board 2, in which it is a slack fit (Figs. 1 and 2). The fixing bolt 5 is a clearance fit in the bore 7 through the sleeve and somewhat longer than the length of the sleeve in its undeformed condition plus the thickness of the article to be fixed. At the inner end 1a of the sleeve 1 is embedded and bonded, a nut 8 which is thus secured against rotation relatively to the sleeve 1 during the driving of the bolt 5 therethrough. A rim or bead 9 is formed around the outer end of the sleeve 1 of a diameter sufficient to prevent the sleeve from falling through the hole 4.

The anchoring device thus constituted is employed as follows:

The fixing hole 4 is first formed through the wall-board 2 of a diameter slightly larger than that of the sleeve 1, and the latter is passed through the fixing hole 4 at the wall-board 2. The cable clip 3 or other article to be fixed is then positioned to register with the bore of the sleeve 1, and the fixing bolt 5 is passed through both the clip 3 and the bore 7 of the sleeve to engage the nut 8. The screw is then tightened, and as this operation proceeds, the nut 8 is drawn towards the wall-board 2 and compresses the sleeve 1 axially. Due to its deformable nature, the sleeve 1 expands freely in the radial direction and when it engages the back edge of the hole 4 in the wall-board, it forms a bulged retaining portion 10 which effectively prevents the return of the sleeve 1 through the hole.

The fixing thus provided is very secure and will withstand quite heavy stresses. Furthermore, it has a useful degree of resilience and, as the rubber is usually located in the dark and at an even temperature (as when the wall is the inner skin of a cavity structure), there is little, if any, deterioration of the rubber.

In an alternative arrangement illustrated in Fig. 4, the nut element is separate and is provided with a rib 8 to engage the inner end 1a of the sleeve.

In this arrangement, the procedure of fixing an article to the wall is varied by first passing the bolt 5 through the mounting hole in the article to be secured, slipping the sleeve over the bolt and re-engaging the nut therewith, inserting the nut and sleeve into the hole in the wall, and tightening the bolt. Moreover, as shown in Fig. 5, the nut element may be a brass or other disc 8a split radially to form inward tongues 8b which are twisted in such fashion that they will be engaged by the thread of a wood-screw 5a and fed axially thereby as the screw is turned. Both a nut 8 for engagement by a bolt 5 and a disc 8a for engagement by a wood-screw 5 may be provided in association with a single sleeve 1, as will be understood.

Again, the nut 8 may be of a material in which a bolt 5 or screw 5a can cut its own thread and yet hard enough to be employed for exerting axial pressure on the sleeve 1 as the bolt 5 or screw 5a is tightened.

It is to be understood that the invention also extends to the composite fixing means obtained by initially engaging a bolt or screw with an anchoring device as set forth above. Although the deformable sleeve has been described as of cylindrical shape, it is to be understood that any other shape may be employed as desired, e. g. elliptical or square.

What I claim is:

1. An anchoring device for use in fixing articles to relatively thin structural members comprising a deformable sleeve of rubber of a length greater than the thickness of the structural member and of a maximum transverse dimension less than that of the fixing hole, a substantially rigid nut element fixed entirely within one end of the rubber sleeve providing a rigid end portion of constant diameter on the deformable sleeve, said rigid end portion being of the same diameter as the diameter of the major portion of the length of the remainder of the sleeve when in undeformed condition, and the nut element having its threaded bore of less diameter than the bore of the sleeve the other end of the sleeve having an external bead thereon, and a threaded fixing member of a diameter to pass with clearance through the bore of the sleeve and of a length sufficient to pass through the article to be fixed and the undeformed sleeve to engage the nut element.

2. An anchoring device for use in fixing articles to relatively thin structural members having a circular fixing hole therein, said anchoring device comprising a deformable sleeve of rubber of substantially circular cross section adapted to extend through the circular fixing hole, and the anchoring device being of a length greater than the thickness of the structural members and of a maximum transverse dimension less than that of the fixing hole, a substantially rigid metallic nut element fixed entirely within one end of the rubber sleeve providing a rigid end portion of constant diameter on the deformable sleeve, said rigid end portion being of the same diameter as the diameter of the major portion of the length of the remainder of the sleeve when in undeformed condition, and the nut element having its threaded bore of less diameter than the bore of the sleeve the other end of the sleeve having an external bead thereon, and a threaded fixing member of a diameter to pass with clearance through the bore of the sleeve and of a length sufficient to pass through the article to be fixed and the undeformed sleeve to engage the nut element.

CHARLES HAROLD TAYLOR.

REFERENCES CITED

The following references are of record in the file of this patent:

UNITED STATES PATENTS

| Number | Name | Date |
|---|---|---|
| 2,255,650 | Burke | Sept. 9, 1941 |
| 2,278,217 | Rodanet | Mar. 31, 1942 |
| 2,365,372 | Allen | Dec. 19, 1944 |
| 2,392,133 | Eklund | Jan. 1, 1946 |

FOREIGN PATENTS

| Number | Country | Date |
|---|---|---|
| 493,131 | Great Britain | May 16, 1936 |